US012516552B2

(12) United States Patent
Liu et al.

(10) Patent No.: US 12,516,552 B2
(45) Date of Patent: Jan. 6, 2026

(54) HANDCUFF STRUCTURE

(71) Applicant: Dongguan Jingtong Machinery Technology Co., Ltd., Guangdong (CN)

(72) Inventors: Jianyi Liu, Guangdong (CN); Chan Li, Guangdong (CN); Yu Liu, Guangdong (CN); Xiaoying Wang, Guangdong (CN); Quanxi Liu, Guangdong (CN)

( * ) Notice: Subject to any disclaimer, the term of this patent is extended or adjusted under 35 U.S.C. 154(b) by 39 days.

(21) Appl. No.: 18/650,180

(22) Filed: Apr. 30, 2024

(65) Prior Publication Data

US 2024/0368925 A1 Nov. 7, 2024

(30) Foreign Application Priority Data

May 6, 2023 (CN) ......................... 202321061234.8

(51) Int. Cl.
*E05B 75/00* (2006.01)

(52) U.S. Cl.
CPC .................................... *E05B 75/00* (2013.01)

(58) Field of Classification Search
CPC ....................................................... E05B 75/00
USPC ............................................................. 70/16
See application file for complete search history.

(56) References Cited

U.S. PATENT DOCUMENTS 691,941 A * 1/1902 Headson ................. E05B 75/00 70/17
1,579,333 A * 4/1926 Neal ....................... E05B 75/00 70/16
1,900,242 A * 3/1933 Latou ....................... E05B 75/00 70/DIG. 32
4,314,466 A * 2/1982 Harris ..................... E05B 75/00 70/16
5,797,284 A * 8/1998 Lurie ...................... E05B 75/00 70/16
7,316,137 B2 * 1/2008 Parsons ................... E05B 75/00 70/432
8,230,706 B1 * 7/2012 Amo ....................... E05B 75/00 70/17
8,353,183 B1 * 1/2013 Lofgren .................. E05B 75/00 70/16
8,356,498 B1 * 1/2013 Gotta ...................... E05B 75/00 70/16
8,683,829 B1 * 4/2014 Gotta ...................... E05B 75/00 70/16
8,769,998 B1 * 7/2014 MacConnell ........... E05B 75/00 70/16
8,776,555 B1 * 7/2014 Lofgren .............. E05B 15/0046 70/16

(Continued)

*Primary Examiner* — Nathan Cumar

(57) ABSTRACT

A handcuff structure, comprising a lock shell, a lock cover, a movable lock ring and a key; the side of the lock shell close to the lock cover is provided with a lock box; the inside of the lock box is provided with a rotating wheel, and the center of the rotating wheel is provided with a rotating shaft; one end of the rotating shaft extends into a first shaft hole at the bottom of the lock box, and the other end of the rotating shaft extends into a second shaft hole at the bottom of the lock cover; the first shaft hole and the second shaft hole are coaxially arranged. The invention can effectively prevent prisoners from opening handcuffs through wires, needles, wooden sticks and other items, avoid criminals from escaping, and improve the overall locking effect of handcuffs.

9 Claims, 11 Drawing Sheets

(56) References Cited

U.S. PATENT DOCUMENTS

| | | | | | |
|---|---|---|---|---|---|
| 8,904,832 | B1 * | 12/2014 | Rodriguez | E05B 75/00 | 70/16 |
| 8,991,224 | B2 * | 3/2015 | Zalavari | F41A 23/18 | 70/279.1 |
| 2012/0085135 | A1 * | 4/2012 | Louden | E05B 75/00 | 70/16 |
| 2013/0133382 | A1 * | 5/2013 | Thompson | E05B 75/00 | 70/431 |
| 2013/0192314 | A1 * | 8/2013 | Cheng | E05B 75/00 | 70/16 |
| 2015/0068256 | A1 * | 3/2015 | Flynn | E05B 75/00 | 70/16 |
| 2015/0176313 | A1 * | 6/2015 | Hines | E05B 75/00 | 70/16 |
| 2019/0145132 | A1 * | 5/2019 | Kovac | E05B 27/0003 | 70/16 |

* cited by examiner

HANDCUFF STRUCTURE

1. TECHNICAL FIELD

The invention relates to the field of police equipment, specifically a handcuff structure.

2. BACKGROUND ART

The police or military handcuffs currently equipped in various countries are all manufactured using the principle of one-way self-locking with ratchet-shaped inner teeth. They are very strong and cannot be opened by force with human hands and feet. However, this design also has the following shortcomings and loopholes, which can be easily opened by exploiting these flaws:

1. disadvantages of ratchet shape: when this kind of ratchet shape is interlocked in the forward and reverse directions, there is a backlash in the semi-engaged state. That is, when the forward external teeth on the handcuff movable ring mesh with the reverse elastic reverse teeth inside the handcuffs, at this time, the spur teeth on the movable ring cannot be moved back, and foreign objects cannot be inserted into the teeth to pry them apart. But at this time, as long as the outer ring of the handcuff is gently pinched so that the four originally engaged teeth are out of the semi-engaged state, a tooth side gap will appear between the teeth; at this time, objects such as thin iron sheets or thin cards are inserted into the outermost tooth from the outside of the handcuffs, thereby pressing down the elastic reverse tooth inside the first tooth, and the handcuffs can be opened instantly. After one of the four intermeshing teeth is pressed down, the remaining teeth will also disengage. Even if it is not easy for the prisoner to obtain the above tools, the handcuffs can be opened by using paper, mineral water bottles torn into narrow strips, snack packaging bags and other light items that are readily available around him. The method is as follows: gently pinch the outer ring of the handcuff, insert the plastic strip or paper strip from the cut mineral water bottle into the gap between the teeth, keep it still, and then gently release the outer ring of the handcuff to re-engage it; in this way, the plastic strip is sandwiched between the front and back teeth, and then pinch the outer ring of the handcuff, so that the front teeth tighten the four teeth inwards; at this time, the plastic piece covers the four meshed teeth of the front and back teeth, causing the originally meshed front and back ratchet teeth to lose their interlocking effect; finally, gently pull the outer ring of the handcuff, and the handcuff will be opened.
2. The existing handcuff keys are universal and relatively simple, and can be easily copied or replaced by small hooks bent into other thin wires. Even if the safety on the handcuffs is opened, the safety can be easily opened using the above objects, and then the handcuffs can be opened by pulling down the spring lever under the anti-tine.
3. The key hole of the handcuffs is now too close to the unlocking lever, and the key hole is in the shape of a round hole, so that the handcuffs can be opened by fumbling while the homemade lock picking tool is rotating in the hole.

Based on the above three points, the safety of existing handcuffs has great hidden dangers, especially criminals who have a certain understanding of handcuffs. As long as they have the opportunity and skills, they can wait for an opportunity to escape successfully. This will cause great trouble to law enforcement and escort personnel, so it is urgent to develop a relatively safe new handcuff to overcome the above shortcomings.

3. SUMMARY OF THE INVENTION

The technical problem to be solved by the invention is to overcome the defects of the above technology and provide a handcuff structure.

In order to solve the above technical problems, the technical solutions provided by the invention are: a handcuff structure, comprising a lock shell, a lock cover, a movable lock ring and a key, wherein the lock shell is fixedly connected to a first fixed lock ring, and the lock cover is fixedly connected to a second fixed lock ring; a hinge shaft is provided between the end of the first fixed lock ring and the end of the second fixed lock ring, and the movable lock ring is movably hinged with the hinge shaft; the outside of the movable lock ring is evenly provided with semicircular tooth grooves; the side wall of the lock shell away from the first fixed lock ring is provided with a lock hole; the side of the lock shell close to the lock cover is provided with a lock box; the inside of the lock box is provided with a rotating wheel, and the center of the rotating wheel is provided with a rotating shaft; one end of the rotating shaft extends into a first shaft hole at the bottom of the lock box, and the other end of the rotating shaft extends into a second shaft hole at the bottom of the lock cover; the first shaft hole and the second shaft hole are coaxially arranged;

- the outer circumferential surface of the rotating wheel is provided with gear teeth and a clamping groove, and the groove walls on both sides of the clamping groove are respectively provided with a horizontal platform and an oblique platform;
- the side of the lock shell close to the first fixed lock ring is provided with a limiting groove, and the inside of the limiting groove is provided with a lock body that can slide axially along the limiting groove; a first spring is provided between the bottom of the lock body and the bottom of the limiting groove, and a communicating groove is provided between the limiting groove and the lock box;
- one side of the lock body close to the movable lock ring is provided with multiple sets of lock columns, and the other side of the lock body is fixedly provided with a connecting rod; the connecting rod extends from the communicating groove to the inside of the clamping groove;
- the side of the lock column facing the first fixed lock ring is provided with a lock groove, and the semicircular tooth groove can pass between the groove walls on both sides of the lock groove; the lock groove of the lock column is set at an acute angle between the groove wall on one side of the first spring and the axis of the lock column, and the other side wall of the lock groove is arranged perpendicularly to the axis of the lock column; the distance between the groove walls on both sides of the lock groove is slightly larger than the thickness of the movable lock ring;
- the bottom end of the key is provided with a key shaft and a driving gear, and the driving gear can be meshed with the gear teeth on the outer peripheral surface of the rotating wheel.

As an improvement, the bottom of the lock box close to the gear teeth of the rotating wheel is provided with a third shaft hole, and the key shaft at the bottom of the key can be inserted into the third shaft hole.

As an improvement, the lock cover is provided with a positioning hole coaxial with the third shaft hole, the lock cover between the positioning hole and the lock hole is provided with a guiding groove, and the guiding groove is arranged in an L shape.

As an improvement, both sides of the guiding groove inside the lock box are respectively provided with a baffle.

As an improvement, the width of the guiding groove is slightly larger than the diameter of the key shaft, and the diameter of the key body is slightly smaller than the diameter of the positioning hole.

As an improvement, the side of the rotating wheel facing the lock cover is provided with a pin hole, and the inside of the pin hole is provided with a limiting pin; a second spring is provided between the limiting pin and the bottom of the pin hole; the top end of the limiting pin is configured as a hemispherical structure; the lock cover is provided with an arc-shaped groove above the rotating wheel; the center of the bottom of the arc-shaped groove and one end of the bottom of the groove close to the oblique platform are provided with limiting pits matched with the limiting pins.

As an improvement, the upper surface of the horizontal platform is slightly lower than the bottom of the outer peripheral surface of the connecting rod; the oblique plane of the oblique platform faces downward, and the highest point of the oblique plane of the oblique platform is slightly higher than the top position of the outer peripheral surface of the connecting rod.

As an improvement, the lock shell and the lock cover are fixedly connected by rivets.

As an improvement, the side of the lock shell away from the first fixed lock ring is installed with a connection buckle for connecting the lock chain.

As an improvement, the diameter of the toothed disc is slightly smaller than the inner diameter of the annular groove.

Beneficial Effects of the Invention

1. The invention can effectively prevent prisoners from opening handcuffs through wires, needles, wooden sticks and other items, avoid criminals from escaping, and improve the overall locking effect of handcuffs. It can also reduce wear to make it more durable, and improve safety.
2. Under the condition that the teeth on the rotating wheel and the teeth on the gear on the key ensure normal meshing, the gears on different handcuffs use different number of teeth, module, tooth direction, tooth shape, and tooth spacing between the two gears. After being arranged and combined, they can be installed separately to ensure that each pair of handcuffs can only be opened with the matching key. This can greatly improve the safety of handcuffs.
3. The semi-circular tooth-shaped engagement can effectively prevent the handcuffs from being opened after foreign objects are inserted, and because the obstruction fitted in the semi-circle is larger in size, the strength is much higher than that of handcuffs with a front and back ratchet structure.

4. BRIEF DESCRIPTION OF ACCOMPANY DRAWINGS

Figure 1:
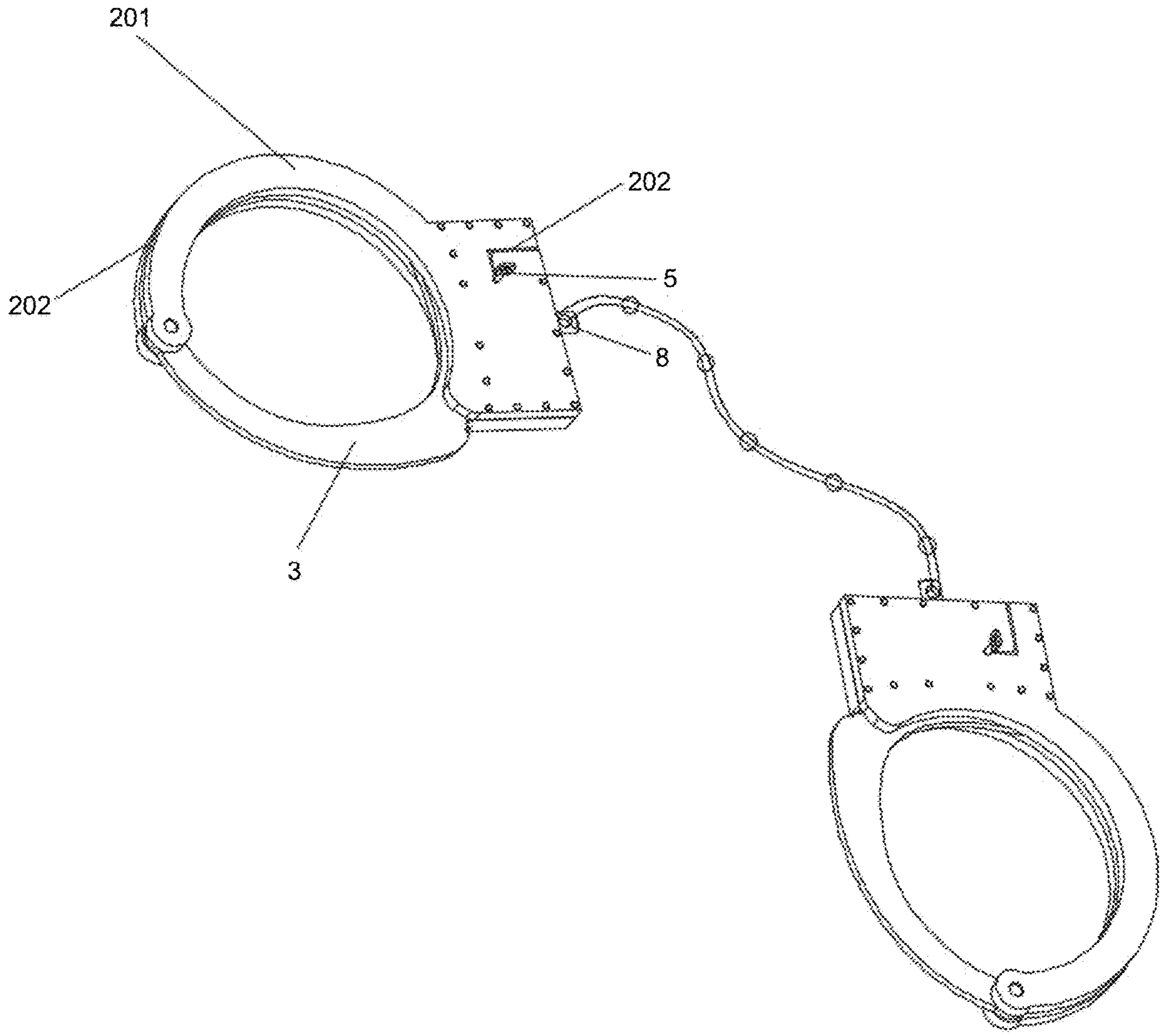
FIG. 1 is a schematic diagram of the external structure of the handcuff according to the invention.

As shown in the figures, 1 refers to the lock shell; 101 refers to the first fixed lock ring; 102 refers to the lock box; 103 refers to the first shaft hole; 104 refers to the communicating groove; 105 refers to the lock hole; 106 refers to the third shaft hole; 107 refers to the limiting groove; 2 refers to the lock cover; 201 refers to the second fixed lock ring; 202 refers to the guiding groove; 203 refers to the positioning hole; 204 refers to the arc-shaped groove; 205 refers to the second shaft hole; 206 refers to the limiting pit; 207 refers to the second lock groove; 3 refers to the movable lock ring; 301 refers to the semicircular tooth groove; 4 refers to the rotating wheel; 401 refers to the rotating shaft; 402 refers to the gear tooth; 403 refers to the pin hole; 404 refers to the clamping groove; 405 refers to the horizontal platform; 406 refers to the oblique platform; 5 refers to the key; 504 refers to the key shaft; 502 refers to the driving gear; 6 refers to the lock body; 601 refers to the lock column; 602 refers to the connecting rod; 603 refers to the lock groove; 7 refers to the baffle; 8 refers to the connecting buckle; 9 refers to the rivet; 10 refers to the limiting pin; 11 refers to the second spring; 12 refers to the hinge shaft; 13 refers to the first spring.

5. SPECIFIC EMBODIMENT OF THE INVENTION

In order to make the objectives, technical solutions, and advantages of the embodiments of the invention clearer, the technical solutions in the embodiments of the invention will be described clearly and completely hereinafter with reference to the drawings in the embodiments of the invention. Obviously, the described embodiments are part of the embodiments of the invention, rather than all of the embodiments. The components of the embodiments of the invention generally described and illustrated in the drawings herein may be arranged and designed in various different configurations.

In the description of the invention, it needs to be understood that the orientation or positional relationship indicated by the terms “center” “up”, “down” “left”, “right”, “vertical”, “horizontal” “inner”, “outer”, etc. are based on the orientation or positional relationship shown in the drawings, which are only for the convenience of describing the invention and simplifying the description, rather than indicating or implying that the device or element referred to must have a specific orientation, be constructed and operated in a specific orientation, and therefore cannot be understood as a limitation of the invention. In addition, the terms “first”, “second”, and “third” are only used for descriptive purposes, and cannot be understood as indicating or implying relative importance or implicitly indicating the number of indicated technical features.

In addition, the terms “horizontal”, “vertical”, “dangling”, etc. do not mean that the component is required to be absolutely horizontal or hanging, but may be slightly inclined. For example, “horizontal” only means that its direction is more horizontal than “vertical”, it does not mean that the structure must be completely horizontal, but can be slightly inclined.

In the description of the invention, “plurality” means at least two.

In the invention, unless otherwise clearly defined and limited, the terms “provided”, “installed”, “connected” and other terms should be interpreted broadly; for example, it can be a fixed connection, it can be a detachable connection, or integrated; it can be a mechanical connection or an electrical connection; it can be a direct connection, or an indirectly connection through an intermediate medium, and it can be an internal communication between two elements or the interaction relationship between two elements. For those of ordinary skill in the art, the specific meaning of the above terms in the invention can be understood according to specific circumstances.

The handcuff structure according to the invention will be further described in detail hereinafter with reference to the drawings.

Figure 2:
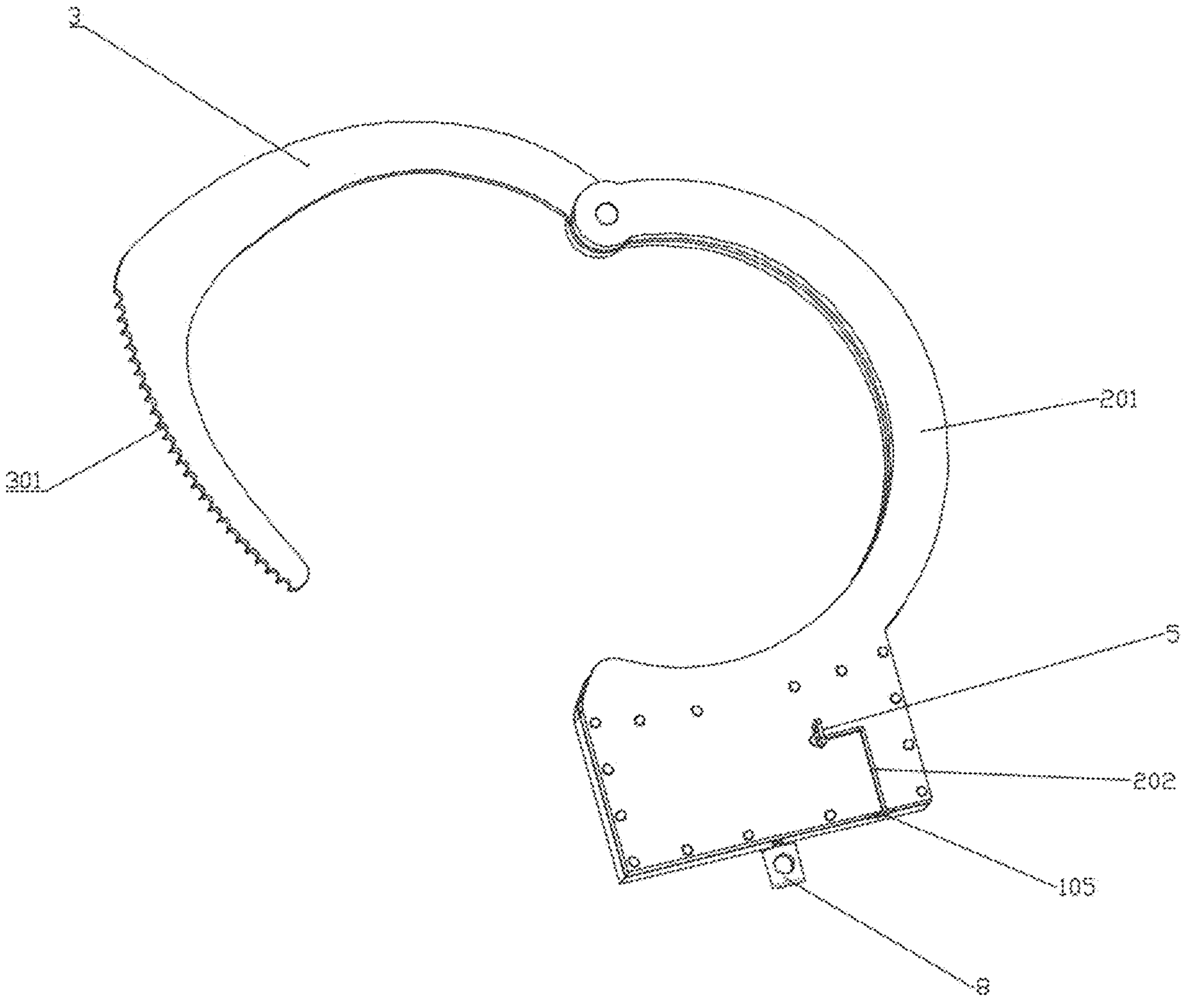
FIG. 2 is a schematic diagram of the handcuff according to the invention in an open state.
Figure 3:
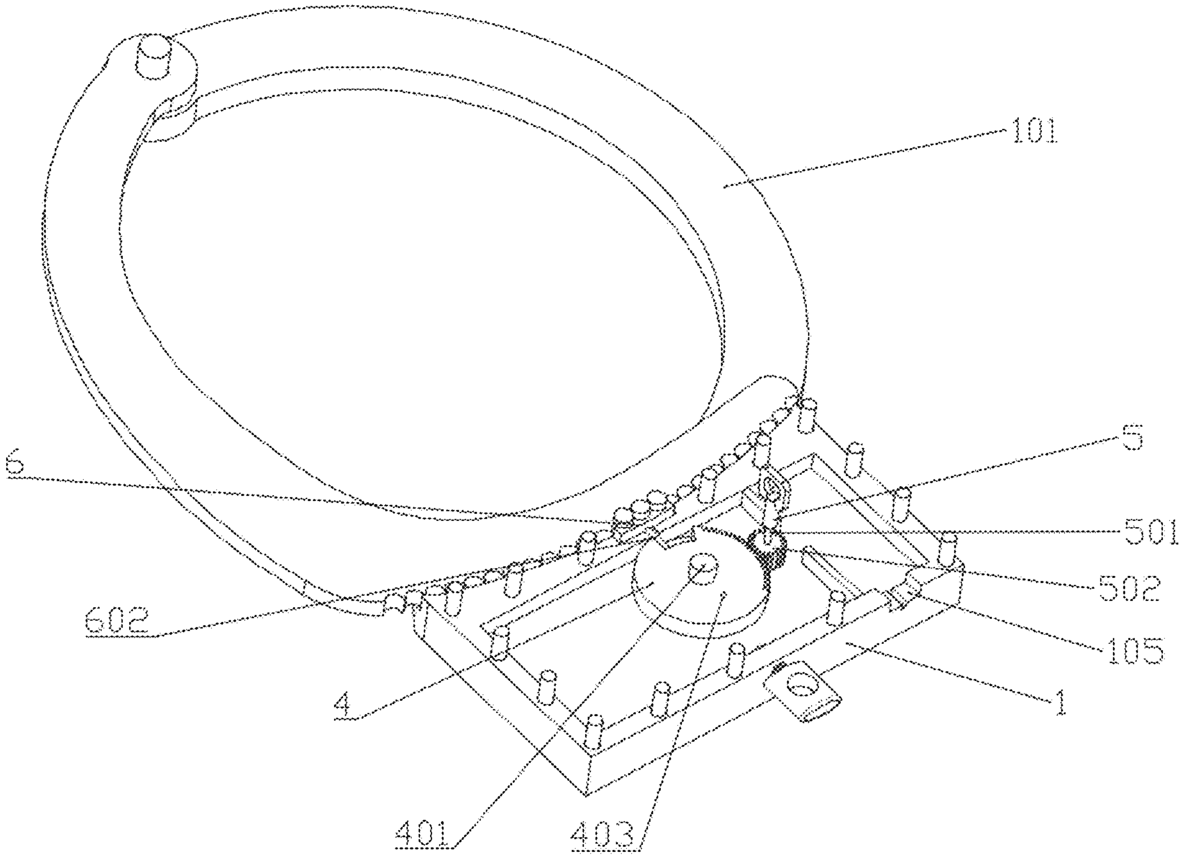
FIG. 3 is a schematic diagram of the internal structure of the handcuff according to the invention.
Figure 4:
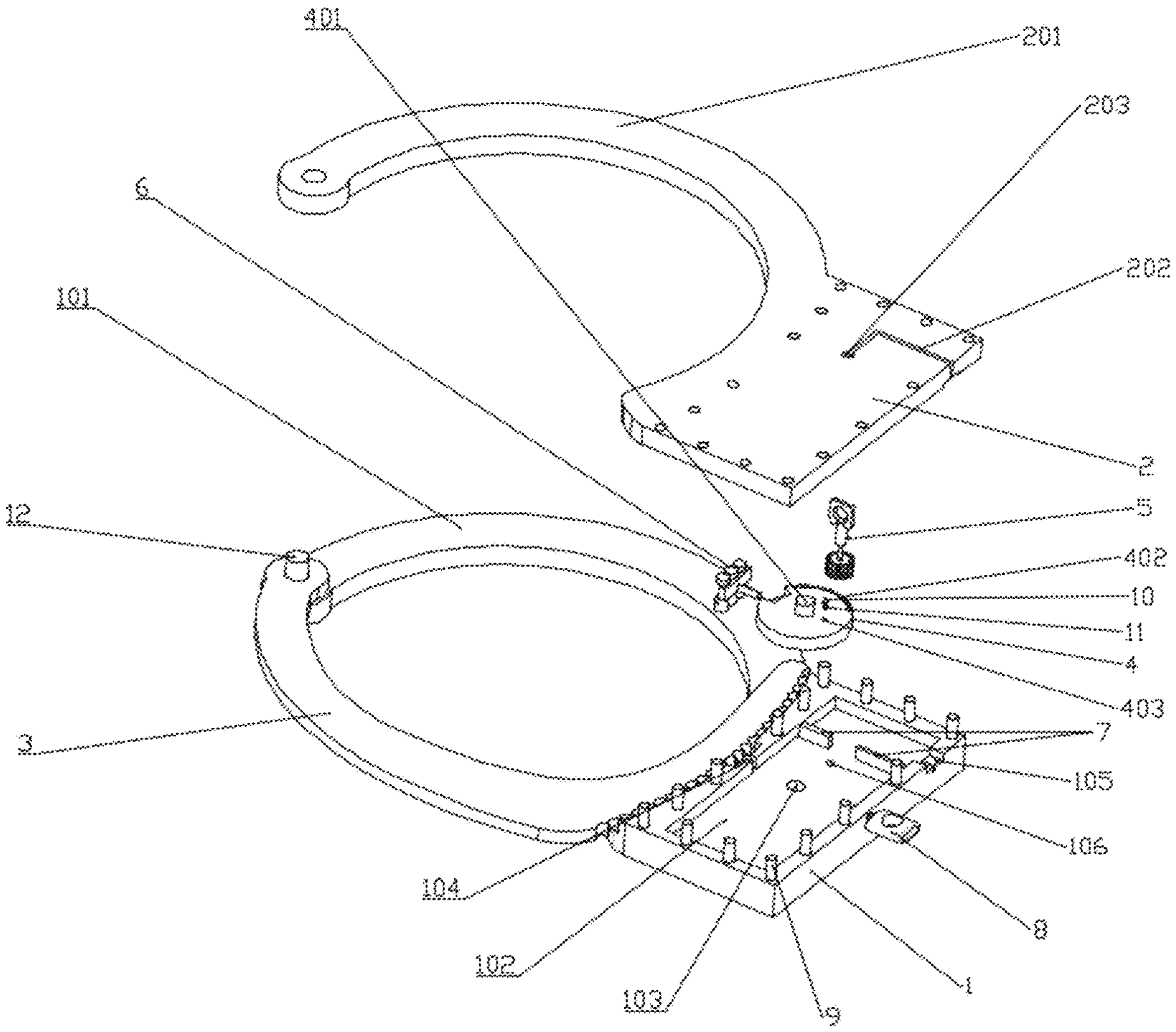
FIG. 4 is a schematic diagram of the explosion of the handcuff according to the invention from the first perspective.
Figure 5:
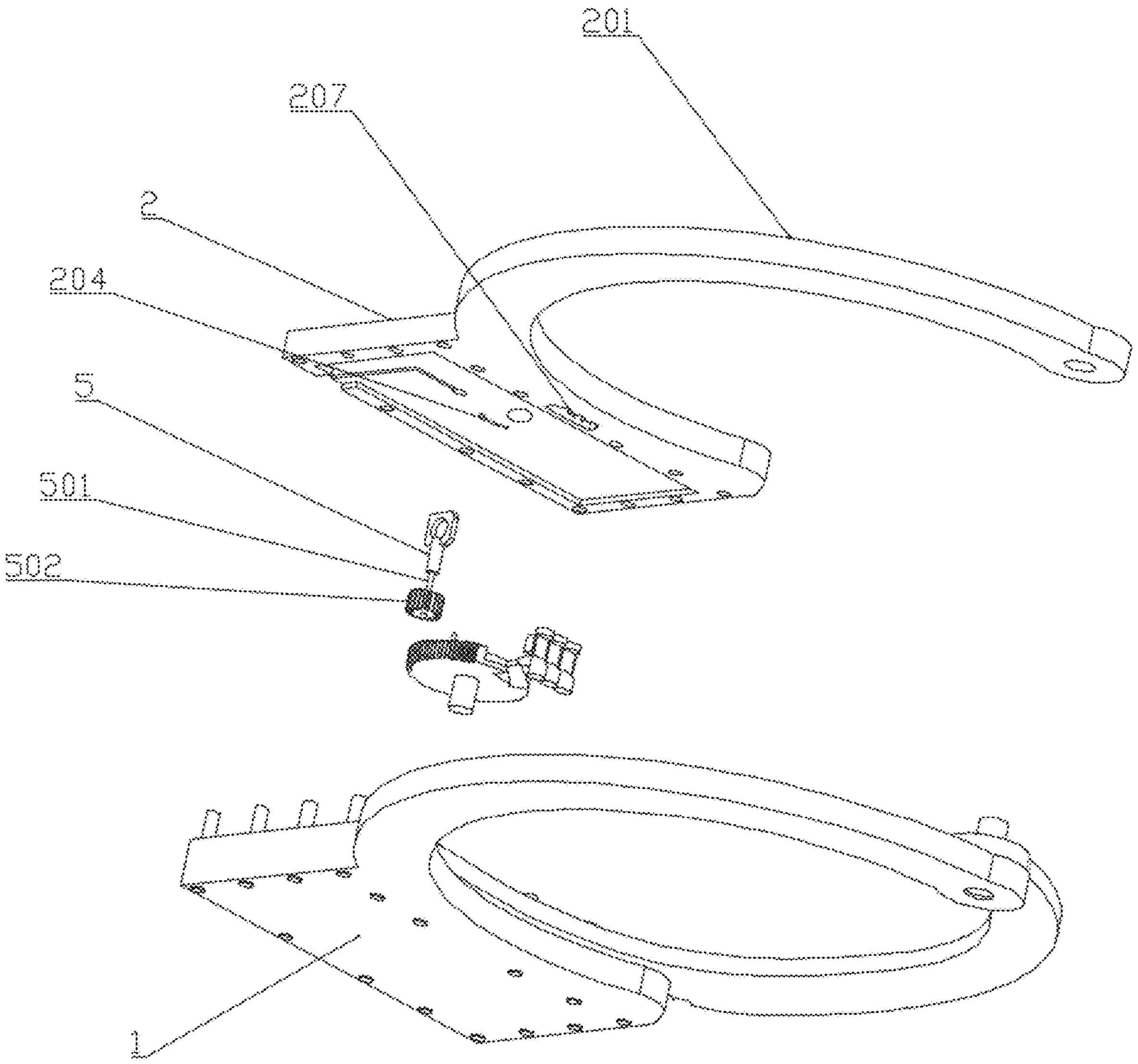
FIG. 5 is a schematic diagram of the explosion of the handcuff according to the invention from the second perspective.
Figure 6:
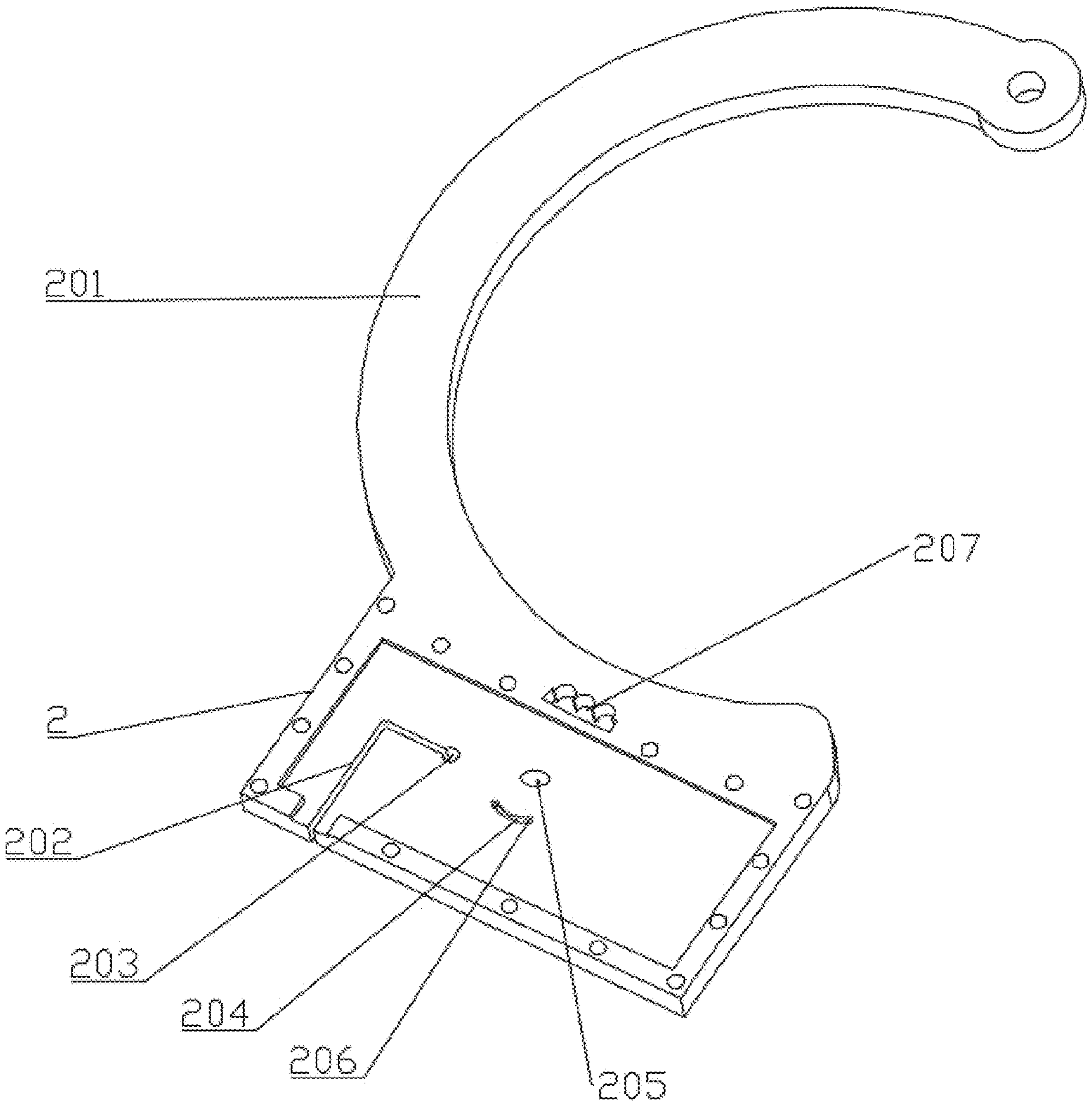
FIG. 6 is a schematic diagram of the structure of the lock cover according to the invention.
Figure 7:
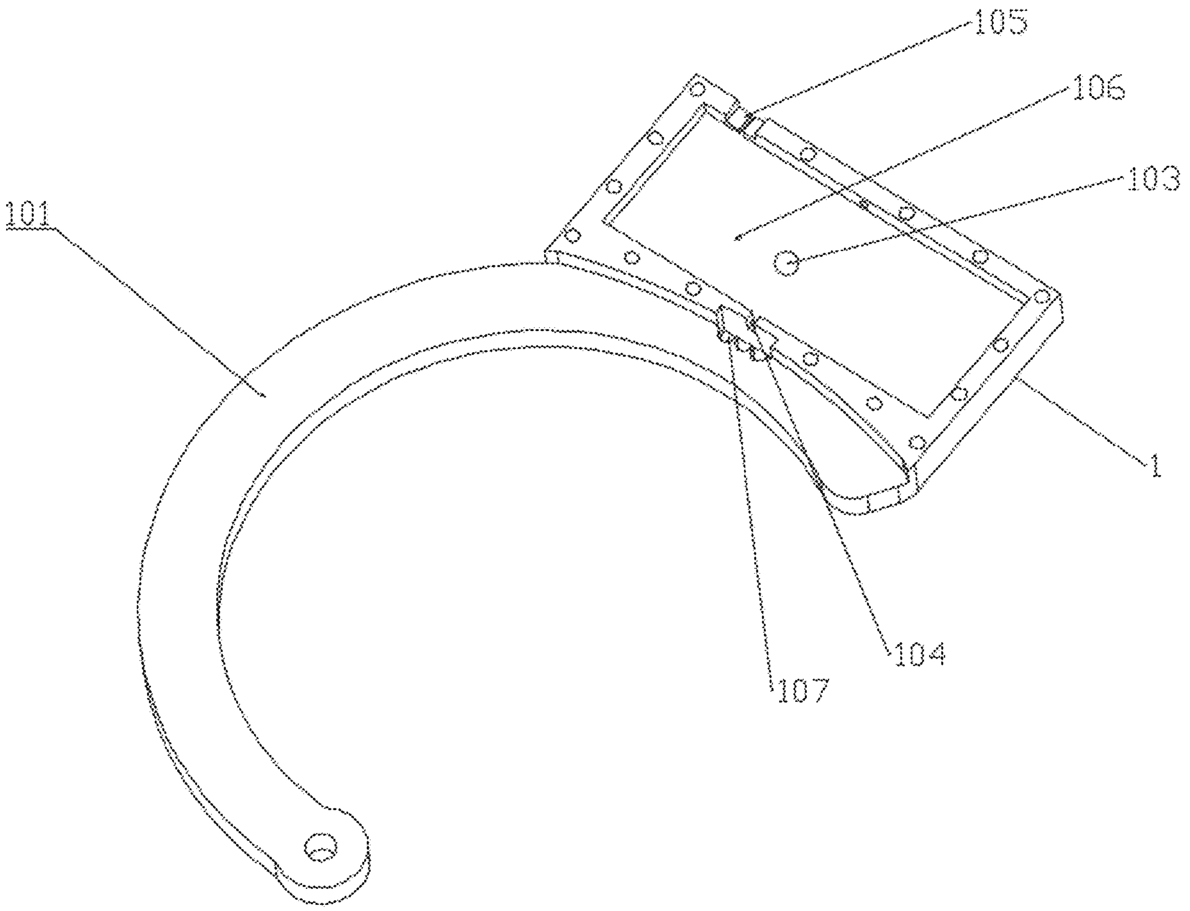
FIG. 7 is a schematic diagram of the structure of the lock shell according to the invention.
Figure 8:
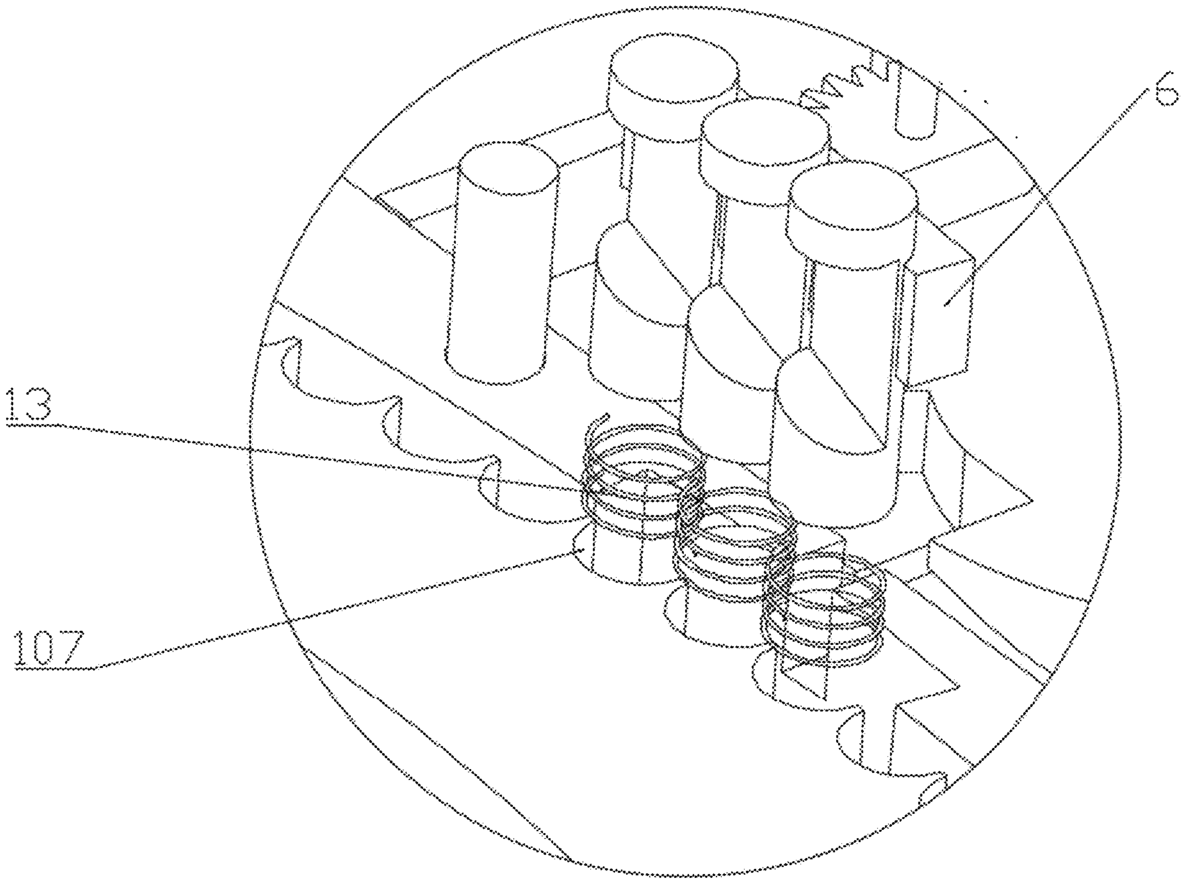
FIG. 8 is a partial installation diagram of the lock body according to the invention.
Figure 9:
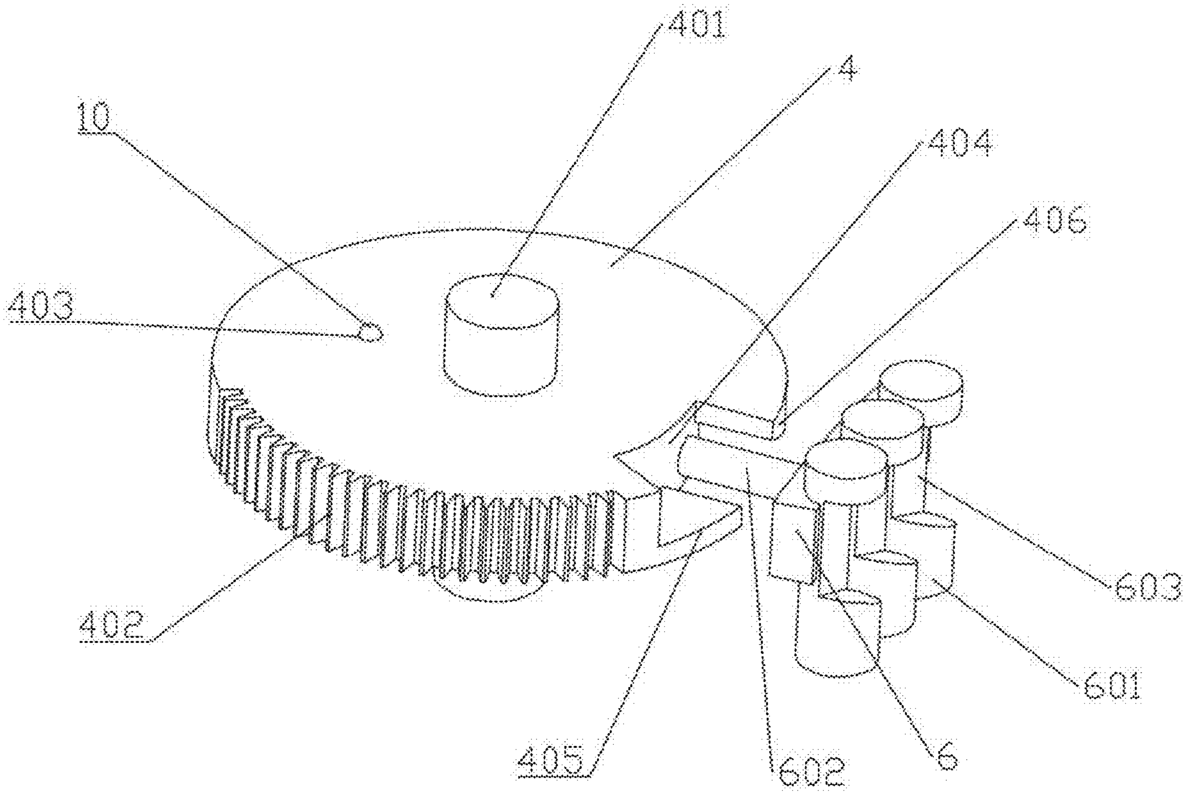
FIG. 9 is a schematic diagram of the connection between the rotating wheel and the lock body according to the invention.
Figure 10:
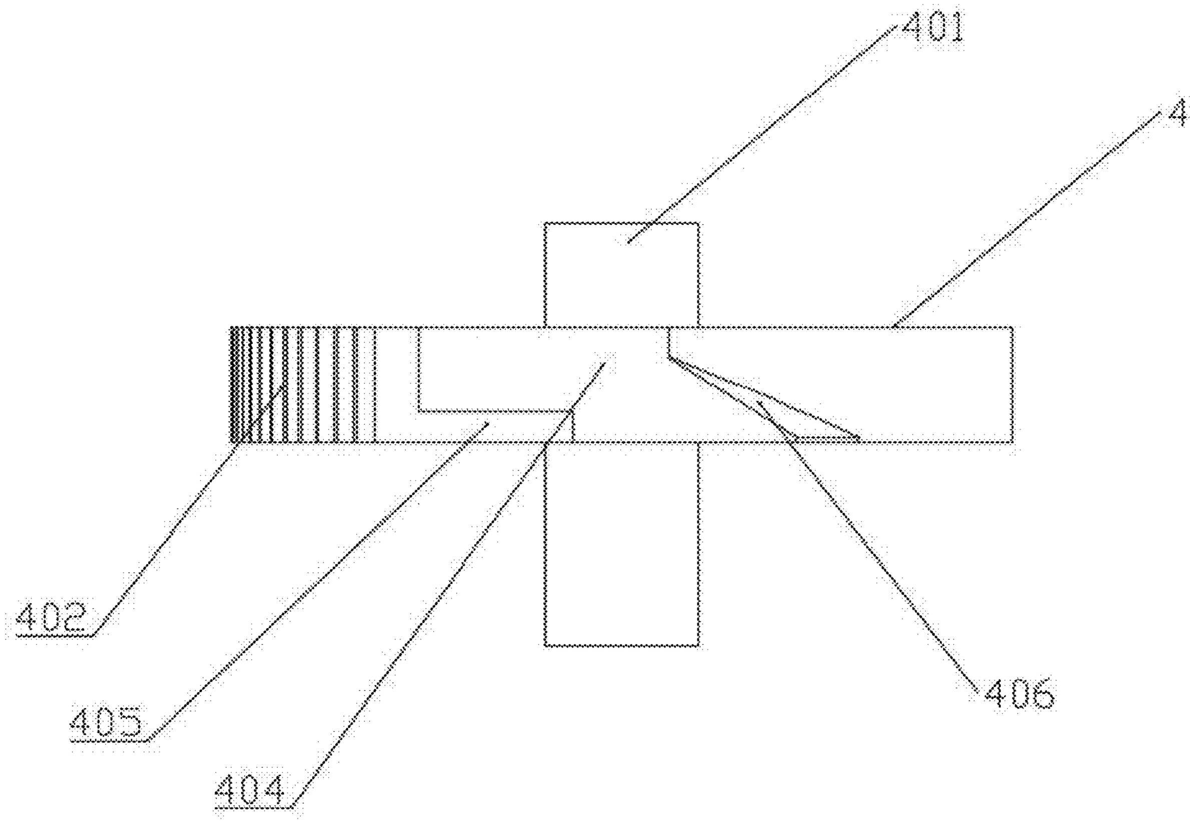
FIG. 10 is a schematic diagram of the front view of the rotating wheel according to the invention.
Figure 11:
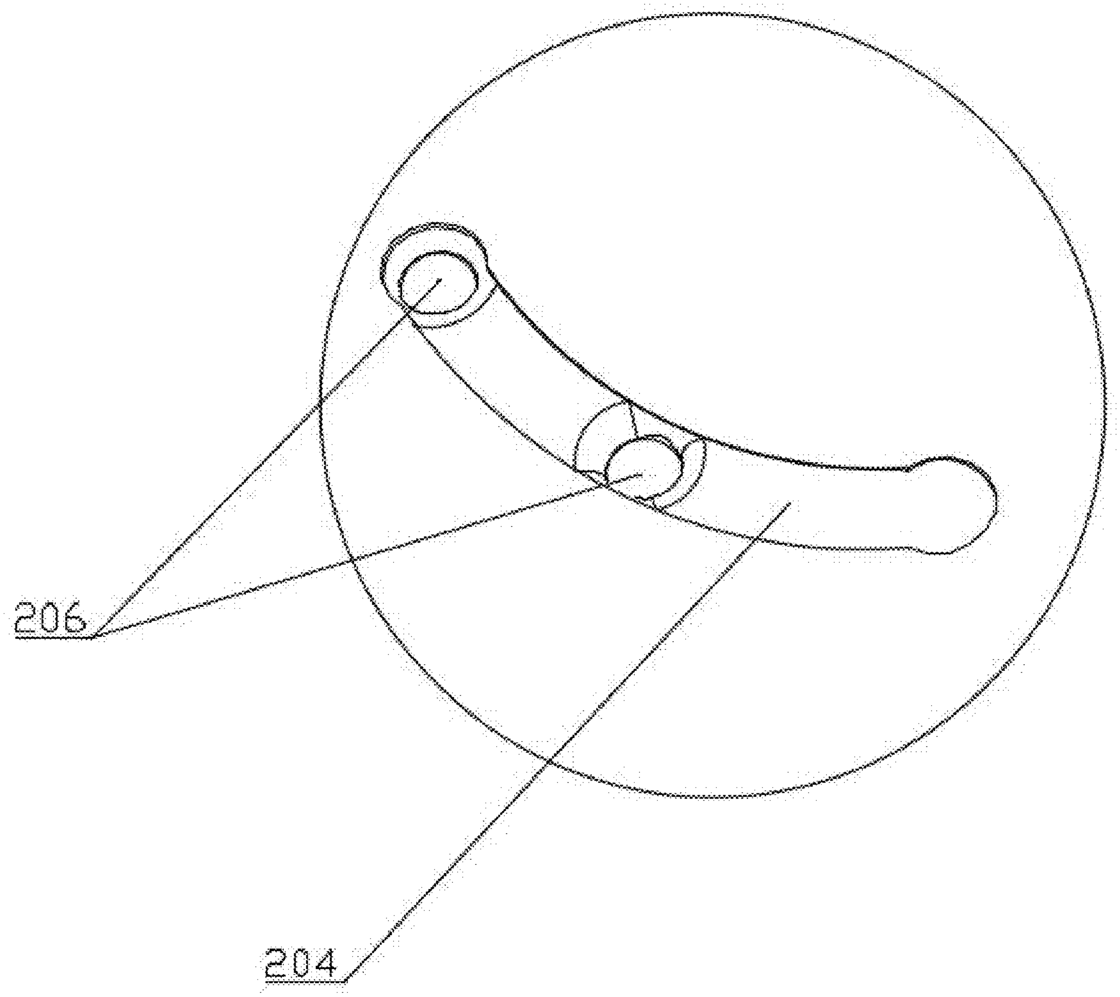
FIG. 11 is a partial enlarged schematic diagram of the arc-shaped groove according to the invention.

With reference to FIGS. 1-11, a handcuff structure, comprising a lock shell 1, a lock cover 2, a movable lock ring 3 and a key 5, wherein the lock shell 1 is fixedly connected to a first fixed lock ring 101, and the lock cover 2 is fixedly connected to a second fixed lock ring 201; a hinge shaft 12 is provided between the end of the first fixed lock ring 101 and the end of the second fixed lock ring 201, and the movable lock ring 3 is movably hinged with the hinge shaft 12; the outside of the movable lock ring 3 is evenly provided with semicircular tooth grooves 301; the side wall of the lock shell 1 away from the first fixed lock ring 101 is provided with a lock hole 105; the side of the lock shell 1 close to the lock cover 2 is provided with a lock box 102; the inside of the lock box 102 is provided with a rotating wheel 4, and the center of the rotating wheel 4 is provided with a rotating shaft 401; one end of the rotating shaft 401 extends into a first shaft hole 103 at the bottom of the lock box 102, and the other end of the rotating shaft 401 extends into a second shaft hole 205 at the bottom of the lock cover 2; the first shaft hole 103 and the second shaft hole 205 are coaxially arranged;

the outer circumferential surface of the rotating wheel 4 is provided with gear teeth 402 and a clamping groove 404, and the groove walls on both sides of the clamping groove 404 are respectively provided with a horizontal platform 405 and an oblique platform 406;

the side of the lock shell 1 close to the first fixed lock ring 101 is provided with a limiting groove 107, and the inside of the limiting groove 107 is provided with a lock body 6 that can slide axially along the limiting groove 107; a first spring 13 is provided between the bottom of the lock body 6 and the bottom of the limiting groove 107, and a communicating groove 104 is provided between the limiting groove 107 and the lock box 102; one side of the lock body 6 close to the movable lock ring 3 is provided with multiple sets of lock columns 601, and the other side of the lock body 6 is fixedly provided with a connecting rod 602; the connecting rod 602 extends from the communicating groove 104 to the inside of the clamping groove 404;

the side of the lock column 601 facing the first fixed lock ring 101 is provided with a lock groove 603, and the semicircular tooth groove 301 can pass between the groove walls on both sides of the lock groove 603; the lock groove 603 of the lock column 601 is set at an acute angle between the groove wall on one side of the first spring 13 and the axis of the lock column 601, and the other side wall of the lock groove 603 is arranged perpendicularly to the axis of the lock column 601; the distance between the groove walls on both sides of the lock groove 603 is slightly larger than the thickness of the movable lock ring 3;

the bottom end of the key 5 is provided with a key shaft 501 and a driving gear 502, and the driving gear 502 can be meshed with the gear teeth 402 on the outer peripheral surface of the rotating wheel 4.

Preferably, the bottom of the lock box 102 close to the gear teeth 402 of the rotating wheel 4 is provided with a third shaft hole 106, and the key shaft 501 at the bottom of the key 5 can be inserted into the third shaft hole 106.

Preferably, the lock cover 2 is provided with a positioning hole 2023 coaxial with the third shaft hole 106, the lock cover 2 between the positioning hole 203 and the lock hole 105 is provided with a guiding groove 202, and the guiding groove 202 is arranged in an L shape.

Preferably, both sides of the guiding groove 202 inside the lock box 102 are respectively provided with a baffle 7.

Preferably, the width of the guiding groove 202 is slightly larger than the diameter of the key shaft 501, and the diameter of the key 5 body is slightly smaller than the diameter of the positioning hole 203.

Preferably, the side of the rotating wheel 4 facing the lock cover 2 is provided with a pin hole 403, and the inside of the pin hole 403 is provided with a limiting pin 10; a second spring 11 is provided between the limiting pin 10 and the bottom of the pin hole 403; the top end of the limiting pin 10 is configured as a hemispherical structure; the lock cover 2 is provided with an arc-shaped groove 204 above the rotating wheel 4; the center of the bottom of the arc-shaped groove 204 and one end of the bottom of the groove close to the oblique platform 406 are provided with limiting pits 206 matched with the limiting pins 10.

Preferably, the upper surface of the horizontal platform 405 is slightly lower than the bottom of the outer peripheral surface of the connecting rod 602; the oblique plane of the oblique platform 406 faces downward, and the highest point of the oblique plane of the oblique platform 406 is slightly higher than the top position of the outer peripheral surface of the connecting rod 602.

Preferably, the lock shell 1 and the lock cover 2 are fixedly connected by rivets 9.

Preferably, the side of the lock shell 1 away from the first fixed lock ring 101 is installed with a connection buckle 8 for connecting the lock chain.

When the invention is implemented, and when a prisoner needs to be cuffed, the movable lock ring 3 intersects with the fixed lock ring, and the outer semicircular tooth groove 301 of the movable lock ring 3 moves between the two sides of the lock groove 603; the semicircular tooth groove 301 presses the lower side wall of the lock groove 603 downward, the lock columns 601 move downward, and the semicircular tooth groove 301 passes between the upper and lower groove walls of the lock groove 603. When the movable lock ring 3 and the fixed lock ring have a tendency to open, the inner wall of the semicircular tooth groove 301 is blocked by the lock columns 601 at the lower groove wall of the lock groove 603; at this time, the semicircular tooth groove 301 cannot pass between the upper and lower groove walls of the lock groove 603.

When using the key 5 to unlock the handcuff or adjust the handcuff to a safe position, extend the driving gear 502 at the lower part of the key 5 into the lock box 102 from the inside of the key hole 105, and the key shaft 501 of the key 5 moves along the guiding groove 202 to the center of the positioning hole 203; the key shaft 501 of the key 5 is inserted downward into the third shaft hole 106, and the cylinder of the key 5 moves down into the positioning hole 203; at this time, the driving gear 502 meshes with the gear teeth 402 on the outer circumferential surface of the rotating wheel 4. Turn the key, and the driving gear 502 drives the rotating wheel 4 to rotate. When the horizontal platform 405 on one side of the clamping groove 404 of the rotating wheel 4 moves to just below the connecting rod 602, the lock columns 601 cannot move downward, causing the semicircular tooth groove 301 to be unable to squeeze the lower side wall of the lock groove 603 downwards, and the movable lock ring 3 and the fixed lock ring cannot continue to cross each other; at this time, the limiting pin 10 is inserted into the limiting pit 206 near the end of the arc-shaped groove 204; pull out the key, and the handcuff is safe now; turn the key and the driving gear 502 drives the rotating wheel 4 to rotate. When the oblique platform 406 on one side of the clamping groove 404 of the rotating wheel 4 moves to directly above the connecting rod 602, the lower oblique plane of the oblique platform 406 squeezes the connecting rod 602 to move downward, and the connecting rod 602 pushes the lock columns 601 to move downward; at this time, the position of the oblique groove wall below the lock groove 603 is lower than the bottom position of the semicircular tooth groove 301, and the semicircular tooth groove 301 can pass smoothly between the upper and lower groove walls of the lock groove 603.

The invention and the embodiments thereof are described hereinabove, and this description is not restrictive. What is shown in the drawings is only one of the embodiments of the invention, and the actual structure is not limited thereto. All in all, structural methods and embodiments similar to the technical solution without deviating from the purpose of the invention made by those of ordinary skill in the art without creative design shall all fall within the protection scope of the invention.

What is claimed is:

1. A handcuff structure, comprising a lock shell, a lock cover, a movable lock ring and a key, wherein the lock shell is fixedly connected to a first fixed lock ring, and the lock cover is fixedly connected to a second fixed lock ring; a hinge shaft is provided between the end of the first fixed lock ring and the end of the second fixed lock ring, and the movable lock ring is movably hinged with the hinge shaft; the outside of the movable lock ring is evenly provided with semicircular tooth grooves; a side wall of the lock shell away from the first fixed lock ring is provided with a lock hole; a side of the lock shell close to the lock cover is provided with a lock box; an inside of the lock box is provided with a rotating wheel, and a center of the rotating wheel is provided with a rotating shaft; one end of the rotating shaft extends into a first shaft hole at a bottom of the lock box, and another end of the rotating shaft extends into a second shaft hole at a bottom of the lock cover; the first shaft hole and the second shaft hole are coaxially arranged;

an outer circumferential surface of the rotating wheel is provided with gear teeth and a clamping groove, and groove walls on both sides of the clamping groove are respectively provided with a horizontal platform and an oblique platform;

the side of the lock shell close to the first fixed lock ring is provided with a limiting groove, and an inside of the limiting groove is provided with a lock body that can slide axially along the limiting groove; a first spring is provided between a bottom of the lock body and the bottom of the limiting groove, and a communicating groove is provided between the limiting groove and the lock box;

one side of the lock body close to the movable lock ring is provided with multiple sets of lock columns, and another side of the lock body is fixedly provided with a connecting rod; the connecting rod extends from the communicating groove to an inside of the clamping groove;

a side of the lock column facing the first fixed lock ring is provided with a lock groove, and the semicircular tooth groove can pass between groove walls on both sides of the lock groove; the lock groove of the lock column is set at an acute angle between groove wall on one side of the first spring and the axis of the lock column, and another side wall of the lock groove is arranged perpendicularly to the axis of the lock column; the distance between the groove walls on both sides of the lock groove is slightly larger than a thickness of the movable lock ring;

a bottom end of the key is provided with a key shaft and a driving gear, and the driving gear can be meshed with gear teeth on the outer peripheral surface of the rotating wheel.

2. The handcuff structure of claim 1, wherein the bottom of the lock box close to the gear teeth of the rotating wheel is provided with a third shaft hole, and the key shaft at the bottom of the key can be inserted into the third shaft hole.

3. The handcuff structure of claim 2, wherein the lock cover is provided with a positioning hole coaxial with the third shaft hole, the lock cover between the positioning hole and the lock hole is provided with a guiding groove, and the guiding groove is arranged in an L shape.

4. The handcuff structure of claim 3, wherein both sides of the guiding groove inside the lock box are respectively provided with a baffle.

5. The handcuff structure of claim 2, wherein the width of the guiding groove is slightly larger than the diameter of the key shaft, and the diameter of the key body is slightly smaller than the diameter of the positioning hole.

6. The handcuff structure of claim 1, wherein the side of the rotating wheel facing the lock cover is provided with a pin hole, and the inside of the pin hole is provided with a limiting pin; a second spring is provided between the limiting pin and the bottom of the pin hole; the top end of the limiting pin is configured as a hemispherical structure; the lock cover is provided with an arc-shaped groove above the rotating wheel; the center of the bottom of the arc-shaped groove and one end of the bottom of the groove close to the oblique platform are provided with limiting pits matched with the limiting pins.

7. The handcuff structure of claim 1, wherein the upper surface of the horizontal platform is slightly lower than the bottom of the outer peripheral surface of the connecting rod; the oblique plane of the oblique platform faces downward, and the highest point of the oblique plane of the oblique platform is slightly higher than the top position of the outer peripheral surface of the connecting rod.

8. The handcuff structure of claim 1, wherein the lock shell and the lock cover are fixedly connected by rivets.

9. The handcuff structure of claim 1, wherein the side of the lock shell away from the first fixed lock ring is installed with a connection buckle for connecting the lock chain.

* * * * *